US012658710B1

(12) United States Patent
York et al.

(10) Patent No.: US 12,658,710 B1
(45) Date of Patent: Jun. 16, 2026

(54) BASE STATION POWER CONVERTER SUITABLE FOR SINGLE-PHASE POWER SOURCES

(71) Applicant: One Three Energy, Inc., Cincinnati, OH (US)

(72) Inventors: Gregory York, Cincinnati, OH (US); Dale Friesen, Winnipeg (CA); Keith Teichmann, Cincinnati, OH (US)

(73) Assignee: One Three Energy, Inc., Cincinnati, OH (US)

( * ) Notice: Subject to any disclaimer, the term of this patent is extended or adjusted under 35 U.S.C. 154(b) by 0 days.

(21) Appl. No.: 18/360,418

(22) Filed: Jul. 27, 2023

(51) Int. Cl.
| | |
|---|---|
| *B60L 53/63* | (2019.01) |
| *H01Q 1/24* | (2006.01) |
| *H02J 3/38* | (2006.01) |
| *H02J 9/06* | (2006.01) |
| *H02M 1/084* | (2006.01) |
| *H02M 5/14* | (2006.01) |
| *H02M 5/22* | (2006.01) |

(52) U.S. Cl.
CPC ............. *H02J 3/381* (2013.01); *H01Q 1/246* (2013.01); *H02J 9/061* (2013.01); *H02M 1/084* (2013.01); *H02M 5/14* (2013.01); *H02M 5/22* (2013.01); *H02J 2300/20* (2020.01)

(58) Field of Classification Search
CPC ........ H02J 3/381; H02J 9/061; H02J 2300/20; H01Q 1/246; H02M 1/084; H02M 5/14; H02M 5/22; B60L 53/63
USPC .......................................................... 307/43
See application file for complete search history.

(56) References Cited

U.S. PATENT DOCUMENTS

| | | | |
|---|---|---|---|
| 3,673,480 | A | 6/1972 | Johnstone |
| 3,809,980 | A | 5/1974 | Nottingham, Jr. |
| 3,931,535 | A | 1/1976 | Roesel, Jr. |

(Continued)

FOREIGN PATENT DOCUMENTS

| | | |
|---|---|---|
| CA | 2358418 C | 11/2008 |
| CA | 2795737 A1 | 5/2013 |

(Continued)

OTHER PUBLICATIONS

"Conversion of Single Phase AC to Three Phase AC Supply", Sharma et al., Apr. 14, 2018, pp. 169-173. (Year: 2018).*

(Continued)

*Primary Examiner* — Rexford N Barnie
*Assistant Examiner* — Xuan Ly
(74) *Attorney, Agent, or Firm* — Wood Herron & Evans LLP

(57) ABSTRACT

A power conversion system for supplying multi-phase electrical power to a power distribution system of a telecommunications base station. The power conversion system includes a utility service connection providing a single-phase alternating current (AC). The power conversion system further includes a high-capacity converter coupled to said utility power source for converting the single-phase AC to a plurality of multi-phase AC. The power conversion system further includes a controller, coupled to said power distribution system and said high-capacity converter, and controlling said high-capacity converter for delivery of power to the telecommunications base station via the plurality of multi-phase AC to provide or support telecommunication services.

6 Claims, 5 Drawing Sheets

(56) References Cited

U.S. PATENT DOCUMENTS

| | | | |
|---|---|---|---|
| 4,079,446 A | 3/1978 | Hertz | |
| 4,158,225 A | 6/1979 | Hertz | |
| 4,168,459 A | 9/1979 | Roesel, Jr. | |
| 4,227,136 A | 10/1980 | Roesel, Jr. | |
| 4,249,237 A | 2/1981 | Ronk et al. | |
| 4,406,950 A | 9/1983 | Roesel, Jr. | |
| 4,412,170 A | 10/1983 | Roesel, Jr. | |
| 4,600,873 A | 7/1986 | Roesel, Jr. et al. | |
| 4,663,536 A | 5/1987 | Roesel, Jr. et al. | |
| 4,906,876 A | 3/1990 | Landseadel | |
| 5,202,617 A | 4/1993 | Nor | |
| 5,594,318 A | 1/1997 | Nor et al. | |
| 5,642,270 A | 6/1997 | Green et al. | |
| 5,803,215 A | 9/1998 | Henze et al. | |
| 5,838,085 A | 11/1998 | Roesel, Jr. et al. | |
| 5,990,590 A | 11/1999 | Roesel, Jr. et al. | |
| 6,297,971 B1 | 10/2001 | Meiners | |
| 6,731,525 B2 | 5/2004 | Meiners | |
| 6,751,842 B2 | 6/2004 | Roesel, Jr. et al. | |
| 6,972,611 B1 | 12/2005 | Thalheim | |
| 7,768,337 B2 | 8/2010 | Bayerer | |
| 8,509,976 B2 | 8/2013 | Kempton | |
| 8,514,601 B2 | 8/2013 | Alexander | |
| 8,698,354 B2 | 4/2014 | Ghosh et al. | |
| 8,941,340 B2 | 1/2015 | Meiners et al. | |
| 9,043,038 B2 | 5/2015 | Kempton | |
| 9,077,052 B2 | 7/2015 | Reddy | |
| 9,118,247 B2 | 8/2015 | Alexander | |
| 9,168,838 B2 | 10/2015 | Kuribayashi et al. | |
| 9,209,698 B2 | 12/2015 | Masuda et al. | |
| 9,431,888 B1 | 8/2016 | Alexander | |
| 9,555,715 B2 | 1/2017 | Sugano | |
| 9,660,460 B2 | 5/2017 | Bishop et al. | |
| 9,754,300 B2 | 9/2017 | Kempton et al. | |
| 9,871,462 B2 | 1/2018 | Medagam et al. | |
| 9,914,365 B2 | 3/2018 | King et al. | |
| 10,000,136 B2 | 6/2018 | Jang et al. | |
| 10,017,068 B2 | 7/2018 | McGrath et al. | |
| 10,333,420 B2 | 6/2019 | Medagam et al. | |
| 10,377,259 B2 | 8/2019 | King et al. | |
| 10,543,755 B2 | 1/2020 | King et al. | |
| 10,836,275 B2 | 11/2020 | Zhu | |
| 10,931,205 B2 | 2/2021 | Medagam et al. | |
| 10,946,763 B2 | 3/2021 | McGrath et al. | |
| 10,981,458 B2 | 4/2021 | Xu | |
| 10,994,628 B2 | 5/2021 | Heyne et al. | |
| 11,052,782 B1 | 7/2021 | Lemberg et al. | |
| 11,196,283 B2 | 12/2021 | Gerrits | |
| 11,780,342 B2 | 10/2023 | Fu et al. | |
| 11,801,761 B2 | 10/2023 | Bouman | |
| 11,884,168 B2 | 1/2024 | King et al. | |
| 12,083,913 B2 | 9/2024 | Keister et al. | |
| 12,100,986 B2 | 9/2024 | Nagano et al. | |
| 12,151,582 B2 | 11/2024 | Goei | |
| 2004/0070278 A1 | 4/2004 | Divan et al. | |
| 2004/0130292 A1 | 7/2004 | Buchanan et al. | |
| 2004/0262996 A1 | 12/2004 | Olsen et al. | |
| 2005/0063115 A1 | 3/2005 | Nayar et al. | |
| 2006/0250902 A1 | 11/2006 | Bender et al. | |
| 2007/0035978 A1 | 2/2007 | Newman | |
| 2007/0093280 A1* | 4/2007 | McKay | H02J 7/00 |
| | | | 455/574 |
| 2009/0236916 A1 | 9/2009 | Nishimura | |
| 2010/0188876 A1 | 7/2010 | Garrity et al. | |
| 2010/0244778 A1 | 9/2010 | Chuang et al. | |
| 2011/0115425 A1 | 5/2011 | Olsson | |
| 2011/0202192 A1 | 8/2011 | Kempton | |
| 2011/0202217 A1 | 8/2011 | Kempton | |
| 2011/0202418 A1 | 8/2011 | Kempton et al. | |
| 2012/0014151 A1 | 1/2012 | Alexander | |
| 2012/0019203 A1 | 1/2012 | Kressner | |
| 2012/0187764 A1 | 7/2012 | Rockenfeller et al. | |
| 2012/0200169 A1 | 8/2012 | Urano | |
| 2013/0002197 A1 | 1/2013 | Hernandez et al. | |
| 2013/0049677 A1 | 2/2013 | Bouman | |
| 2013/0057211 A1 | 3/2013 | Kuribayashi et al. | |
| 2013/0069592 A1 | 3/2013 | Bouman | |
| 2013/0127381 A1 | 5/2013 | Meiners et al. | |
| 2013/0134953 A1 | 5/2013 | Shi | |
| 2013/0175990 A1 | 7/2013 | Jung et al. | |
| 2013/0179061 A1 | 7/2013 | Gadh et al. | |
| 2013/0229153 A1 | 9/2013 | Sarkar et al. | |
| 2013/0257146 A1 | 10/2013 | Nojima et al. | |
| 2013/0314039 A1 | 11/2013 | Weber et al. | |
| 2014/0029320 A1 | 1/2014 | Alexander | |
| 2014/0058577 A1 | 2/2014 | Erhart et al. | |
| 2014/0088781 A1 | 3/2014 | Kearns et al. | |
| 2014/0159650 A1 | 6/2014 | Beauregard | |
| 2014/0207319 A1 | 7/2014 | King et al. | |
| 2015/0061569 A1 | 3/2015 | Alexander et al. | |
| 2015/0137751 A1 | 5/2015 | King et al. | |
| 2015/0155715 A1 | 6/2015 | Kobayashi | |
| 2015/0328999 A1 | 11/2015 | Dureau et al. | |
| 2015/0367740 A1 | 12/2015 | McGrath et al. | |
| 2015/0375627 A1 | 12/2015 | Weber et al. | |
| 2016/0039303 A1 | 2/2016 | Kuribayashi et al. | |
| 2016/0096437 A1 | 4/2016 | Tripathi et al. | |
| 2017/0001528 A1 | 1/2017 | King et al. | |
| 2017/0129348 A1 | 5/2017 | Jang et al. | |
| 2017/0170743 A1 | 6/2017 | Medagam et al. | |
| 2017/0229918 A1 | 8/2017 | Madawala et al. | |
| 2017/0320395 A1 | 11/2017 | Vallender et al. | |
| 2018/0001773 A1 | 1/2018 | King et al. | |
| 2018/0029545 A1 | 2/2018 | Mohrmann et al. | |
| 2018/0029546 A1 | 2/2018 | Mohrmann et al. | |
| 2018/0041061 A1 | 2/2018 | McLaughlin et al. | |
| 2018/0162228 A1 | 6/2018 | Götz et al. | |
| 2018/0162229 A1 | 6/2018 | Götz et al. | |
| 2018/0198282 A1 | 7/2018 | Hunt et al. | |
| 2018/0212438 A1 | 7/2018 | Bouman | |
| 2018/0254658 A1 | 9/2018 | Koerner et al. | |
| 2018/0273016 A1 | 9/2018 | Xu | |
| 2018/0278168 A1 | 9/2018 | Brown et al. | |
| 2018/0281609 A1 | 10/2018 | Yang et al. | |
| 2018/0290546 A1 | 10/2018 | McGrath et al. | |
| 2018/0362016 A1 | 12/2018 | Atala et al. | |
| 2019/0168630 A1 | 6/2019 | Mrlik et al. | |
| 2019/0176651 A1 | 6/2019 | King et al. | |
| 2019/0241089 A1 | 8/2019 | Heyne et al. | |
| 2019/0288539 A1 | 9/2019 | Vela Garcia | |
| 2019/0389314 A1 | 12/2019 | Zhu | |
| 2020/0039358 A1 | 2/2020 | Duan | |
| 2020/0062138 A1 | 2/2020 | Smolenaers | |
| 2020/0070643 A1 | 3/2020 | Huh et al. | |
| 2020/0076225 A1 | 3/2020 | Naylor | |
| 2020/0114770 A1 | 4/2020 | King et al. | |
| 2020/0160461 A1 | 5/2020 | Kaniki | |
| 2020/0189404 A1 | 6/2020 | Haugan et al. | |
| 2020/0251911 A1 | 8/2020 | Hunt et al. | |
| 2020/0269704 A1 | 8/2020 | Duan et al. | |
| 2020/0298722 A1 | 9/2020 | Smolenaers | |
| 2020/0361323 A1 | 11/2020 | Chon et al. | |
| 2020/0377043 A1 | 12/2020 | Pighi et al. | |
| 2020/0391682 A1 | 12/2020 | Ganireddy et al. | |
| 2021/0036536 A1 | 2/2021 | Ruppert | |
| 2021/0111582 A1* | 4/2021 | Livingston | H02J 7/0042 |
| 2021/0155094 A1 | 5/2021 | Pighi et al. | |
| 2021/0221238 A1 | 7/2021 | Duan et al. | |
| 2021/0268931 A1 | 9/2021 | Gupta | |
| 2021/0362614 A1 | 11/2021 | Carr | |
| 2021/0370793 A1 | 12/2021 | Tombelli et al. | |
| 2022/0009373 A1 | 1/2022 | Patel | |
| 2022/0045536 A1 | 2/2022 | Nagano et al. | |
| 2022/0161677 A1 | 5/2022 | Pizzurro et al. | |
| 2022/0173595 A1 | 6/2022 | Lehn et al. | |
| 2022/0212551 A1 | 7/2022 | Bouman | |
| 2022/0234467 A1 | 7/2022 | Nakamura | |
| 2022/0332210 A1 | 10/2022 | Goei | |
| 2022/0355681 A1 | 11/2022 | King et al. | |
| 2022/0402390 A1 | 12/2022 | Smolenaers | |
| 2023/0011000 A1 | 1/2023 | Zhou et al. | |
| 2023/0011977 A1 | 1/2023 | Nguyen et al. | |
| 2023/0047524 A1 | 2/2023 | Lehn et al. | |
| 2023/0049722 A1 | 2/2023 | King et al. | |

(56)          References Cited

U.S. PATENT DOCUMENTS

| | | | |
|---|---|---|---|
| 2023/0062531 A1 | 3/2023 | Jayachand |
| 2023/0094716 A1 | 3/2023 | Zenner et al. |
| 2023/0135028 A1 | 5/2023 | Eggers et al. |
| 2023/0145630 A1 | 5/2023 | Chow et al. |
| 2023/0211686 A1 | 7/2023 | Smolenaers |
| 2023/0271524 A1 | 8/2023 | Kulkarni et al. |
| 2024/0157821 A1 | 5/2024 | King et al. |
| 2024/0217363 A1 | 7/2024 | Wolfe et al. |
| 2024/0258804 A1 | 8/2024 | Herranz et al. |
| 2024/0383347 A1 | 11/2024 | Seroff et al. |
| 2024/0416779 A1 | 12/2024 | Boucher et al. |
| 2025/0010731 A1 | 1/2025 | Vahedi et al. |
| 2025/0253677 A1 | 8/2025 | Stanfield et al. |
| 2025/0286380 A1 | 9/2025 | Friesen et al. |

FOREIGN PATENT DOCUMENTS

| | | | |
|---|---|---|---|
| CA | 2984072 A1 | 6/2018 |
| CN | 100490550 C | 5/2009 |
| CN | 112367566 A | 2/2021 |
| CN | 113765163 A | 12/2021 |
| EP | 1289111 A1 | 3/2003 |
| JP | WO2015008467 A1 | 3/2017 |
| KR | 102304469 B1 | 9/2021 |
| WO | 2015008467 A1 | 1/2015 |

OTHER PUBLICATIONS

PCT/US2024/039299, International Search Report and Written Opinion, Oct. 11, 2024.

PCT/US2025/019117, International Search Report dated Jul. 1, 2025.

PCT/US2025/019117, Written Opinion dated Jul. 1, 2025.

* cited by examiner

BASE STATION POWER CONVERTER SUITABLE FOR SINGLE-PHASE POWER SOURCES

RELATED APPLICATION(S)

This application is related to U.S. patent application Ser. No. 18/179,787 filed on Mar. 7, 2023, which claims priority to U.S. Provisional Patent Application No. 63/362,551 filed on Apr. 6, 2022, as well as U.S. Provisional Patent Application No. 63/481,324 filed on Jan. 24, 2023, U.S. Provisional Patent Application No. 63/481,332 filed on Jan. 24, 2023, and U.S. Provisional Patent Application No. 63/481, 342 filed on Jan. 24, 2023, the disclosures of which are incorporated by reference herein in their entireties.

FIELD OF THE INVENTION

The present invention pertains to the wide-spread deployment of power distribution systems for base stations and specifically to innovations directed towards allowing those power distribution systems to operate in environments with single-phase alternating current (AC) utility supply.

BACKGROUND OF THE INVENTION

Telecommunication providers have invested billions of dollars to create an infrastructure of base stations and connected equipment/wiring that enables wireless communication. A base station typically includes a baseband unit (BBU), a remote radio unit (RRU), antennas, transceivers, power amplifiers, filters and duplexers, and/or the like. In the context of third generation (3G), fourth generation (4G), and fifth generation (5G) communications, point to point microwave, satellite, TV White Space (TVWS), optical communications, low power technologies, high power technologies, and other telecommunications systems, a base station often includes massive multiple-input multiple-output (MIMO) antennas, small cell controllers, beamforming units, integrated access and backhaul (IAB) units, additional fronthaul systems, and/or the like. Power lines that provide the AC utility power supply to these base stations extend thousands of miles and power line infrastructure has been established all over the world.

To effectively manage this infrastructure, telecommunication providers have to ensure that these base stations have a sufficient and consistent supply of power to satisfy steadily rising operational demands. To handle this operational demand, many base stations, and base station equipment, have been fitted to receive multi-phase power. In large metropolitan areas, multi-phase utility services are readily available. However, due to their higher charge rate and related electrical capacity requirements, multi-phase utility services require a consistent multi-phase energy flow from the utility that is not readily available in many locations within the existing infrastructure. In particular, infrastructure supporting rural areas or remote locations is often served using single-phase utility services. The result is that many of these rural areas are left with a single-phase electric power infrastructure which has a limited service capacity. This limited capacity may become increasingly more of a problem as certain rural areas become more populated, as telecommunications increases in its densification, as internet usage continues to rise exponentially, and as the prevalence of internet of things (IoT) devices continues to rise.

Furthermore, rural or more remote locations are frequently plagued by poor power quality with more frequent voltage fluctuations, surges/sags, interruptions, and lesser reliability than is common in higher-density urban settings with more robust utility networks. Long radial single-phase distribution feeders used in most rural networks are designed to serve widely-dispersed electric loads that are generally smaller in size, and therefore, these feeders often lack the electrical capacity and multi-phase configurations needed to support multi-phase input power supply.

A further issue arises from the nature of the single-phase distribution networks used to serve many rural, or remote, locations across the United States, and other countries like Canada, Mexico, South Africa, India, Australia, etc. Specifically, many rural areas are supplied with long radial single-phase feeders rather the shorter higher capacity three-phase feeders used in higher-density urban locales where the base station infrastructure supports multi-phase input power supply. The primary advantage of single-phase power delivery relates to the cost of the utility distribution infrastructure, where for a given electrical capacity, a lower cost single or two-wire single-phase distribution system requires fewer conductors and smaller structures, thus saving both conductor material and reducing required pole sizes relative to multi-phase systems.

In typical residential, agricultural, small commercial/industrial applications, higher voltage single-phase distribution power is delivered to each neighborhood (or service area) and then transformed to lower capacity 240V service for individual customers using pole-mounted single-phase center-tapped "split phase" transformers. The center tap is connected to a distribution system neutral or grounded with a short strap to the transformer case, forming a neutral terminal through the bonded ground conductor. This neutral terminal, along with the two secondary (or hot) terminals are delivered to each residence, thus providing two 120 Vac supplies with respect to the neutral, which are 180 degrees out of phase with each other and therefore capable of providing a 240 Vac supply for larger equipment in the serviced premise. Circuits for lighting and small appliance power outlets (i.e., NEMA 1 and NEMA 5) typically use 120 V circuits connected between one of the 120 V hot lines and neutral protected by a single-pole circuit breaker. Higher-demand applications, such as air conditioners, are often powered using 240 Vac circuits connected between the two 120 Vac lines. These 240 Vac loads are protected by two-pole circuit breakers and are either hard-wired or use NEMA 10 or NEMA 14 outlets which are deliberately incompatible with the 120 Vac outlets.

Due to the heavy electrical demand of base stations and related equipment, it is common for base station distribution systems to be supplied with three-phase, 480 Vac power (Delta or Wye) as is typically delivered from three-phase utility transformers serving commercial/industrial areas. This configuration is generally preferred because three-phase power can be rectified into a low-ripple DC voltage suitable for providing power to a base station, because the three-phases provide peak voltage six times per AC cycle rather than only twice as is the case with single-phase power (or split-phase power). Furthermore, three-phase power reduces the current carried in each supply conductor by providing three wires to share the larger current draw needed to support the power requirements of a base station power distribution system. Unfortunately, many areas, including rural and agricultural regions, smaller communities, and lighter commercial/industrial areas, are often supplied using single-phase utility distribution systems that provide utility service in 240 or 480 Vac single-phase configurations. As a result, three-phase 480 Vac electric power is often not readily available. Providing three-phase service can be cost-prohibitive, as it often requires miles of new three-phase distribution infrastructure to be constructed in order to provide service at locations where multi-phase power may be desired.

What is therefore needed, is supporting infrastructure enabling a base station the use of multi-phase power, without having to rebuild the power lines infrastructure such that it provides multi-phase input utility power.

SUMMARY OF THE INVENTION

Some embodiments described herein include a power conversion system that supplies multi-phase electrical power to a power distribution system of a base station, where the power line infrastructure supporting the base station provides the power supply in the form of single-phase AC. For example, the power conversion system may include a high-capacity converter coupled to a single-phase utility power source that may convert single-phase AC (provided as part of a utility service connection) to multi-phase AC. The power conversion system may further include a controller, coupled to the converter and to the power distribution system of the base station, where the controller uses the multi-phase AC to deliver power to the base station, such that the base station is enabled to provide or support telecommunication services.

By converting single-phase electrical power to multi-phase electrical power, the power conversion system provides a base station with multi-phase electrical power, even when the base station is supported using a utility service connection that provides only single-phase electrical power. In this way, the power conversion system efficiently and effectively utilizes power resources and reduces infrastructure costs relative to replacing the single-phase utility service connection with a utility connection that provides multi-phase electrical power.

In one aspect, the present invention features a power conversion system supplying multi-phase electrical power to a power distribution system of a telecommunications base station. The power conversion system includes a utility service connection providing a single-phase alternating current (AC). The power conversion system further includes a high-capacity converter coupled to said utility power source for converting the single-phase AC to a plurality of multi-phase AC. The power conversion system further includes a controller, coupled to said power distribution system and said high-capacity converter. The controller may control said high-capacity converter for delivery of power to the telecommunications base station via the plurality of multi-phase AC to provide or support telecommunication services.

In an embodiment, the power conversion system further includes a monitoring and control system coupled to the controller, in communication with a remote computing device for monitoring and control of power supplied to the power distribution system.

In another embodiment, the controller, during delivery of power to the telecommunications base station, delivers the power to a heating ventilation and cooling (HVAC) system of the telecommunications base station such that the HVAC system utilizes the power to provide HVAC services to the high-capacity converter. In this embodiment, the HVAC system, when providing the HVAC services, reduces an ambient temperature by an amount that satisfies a configurable threshold temperature.

In another embodiment, a battery energy storage system (BESS) is configured to provide the plurality of multi-phase AC when the utility service connection is down.

In another aspect, the present invention features a method for supplying multi-phase electrical power to a power distribution system of a telecommunications base station. The method includes receiving, by a power conversion system and via a utility service connection, a single-phase alternating current (AC). The method further includes converting, by a high-capacity converter of the power conversion system, the single-phase AC to a plurality of multi-phase AC. The method further includes controlling, by a controller of the power conversion system, said high-capacity converter for delivery of power to the telecommunications base station via the plurality of multi-phase AC to provide or support telecommunication services.

The objects and advantages of the present invention shall be made further apparent from the accompanying drawings and the description thereof.

BRIEF DESCRIPTION OF THE DRAWINGS

The accompanying drawings, which are incorporated in and constitute a part of this specification, illustrate embodiments of the invention, which together with the detailed descriptions given below, explain various aspects of the invention and its application.

DETAILED DESCRIPTION

Figure 1:
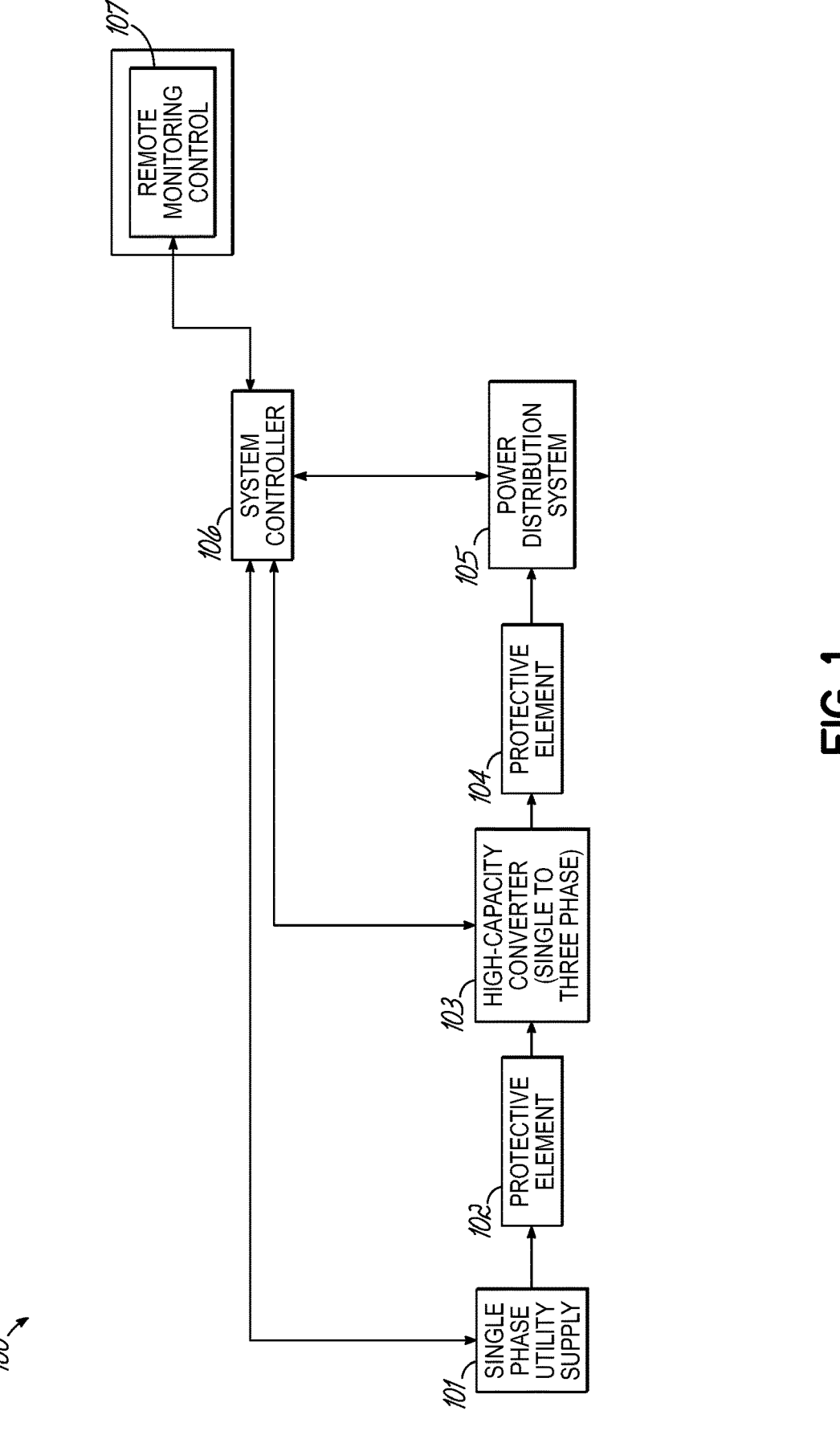
FIG. 1 illustrates a combined system diagram that includes a single-phase utility supply, a remote monitoring control system, and a power conversion system described according to the principles of the present disclosure.

FIG. 1 illustrates a combined system diagram 100 that includes a single-phase utility supply 101, a remote monitoring control system 107, and a power conversion system described according to the principles of the present disclosure. The power conversion system may include a protective element 102, a high-capacity converter 103, a protective element 104, and a system controller 106. One or more of these devices and/or components may be part of a base station. In some embodiments, the power conversion system may include a utility service connection. The high-capacity converter 103 may be used to supply electrical power to a power distribution system 105 through conversion of a single-phase utility power supply to a multi-phase output power to permit the base station to provide or support one or more telecommunication services.

Some embodiments described herein utilize a single-phase utility power supply, such as a single-phase 480 Vac (e.g., 480 volts of AC supply power), and produce three-phase output power, such as three-phase 480 Vac (e.g., 480 volts of AC output power). In other embodiments, a different number of phases may be provided as the output power, such as two-phases, four-phases, or other multi-phase output power formats for powering a base station with different input power requirements.

Utility power is generated by a utility power source, such as an electric generator, a turbine, a fuel cell, a solar panel, and/or the like. The utility power is provided to a utility power supply 101. The utility power supply 101 may deliver utility power to single-phase alternating current (AC) (sometimes referred to herein as single-phase input power, or single-phase power). In some embodiments, the utility power supply 101, or connections to the utility, may be implemented within a utility supply termination enclosure and fused disconnect box. In some situations, a generator or power source may be owned by a non-utility entity. This is often referred to as distributed energy resources (DER) or behind-the-meter generation. This power source may be connected to a utility service or may operate using a configuration that does not have a connection to a utility service.

In some embodiments, the utility power supply 101 may provide single-phase power to the high-capacity converter 103. For example, the utility power supply 101 may provide the single-phase power via protective element 102. In this case, circuitry in the utility power supply 101, which may be controlled by a system controller 106 (e.g., a programmable logic controller (PLC)), may deliver the single-phase power to the high-capacity converter 103 (e.g., via the protective element 102). To provide a specific example, the single-phase power provided may be 120/240 volts. That is to say, split phase AC may be supplied across two hot wires and a ground wire, where the voltage from each hot wire to ground is 120 volts, and the voltage between the hot wires is 240 volts. To provide another example, the single-phase power provided may be 240/480 volts. That is to say, split phase AC may be supplied across two hot wires and a ground wire, where the voltage from each hot wire to ground is 240 volts, and the voltage between the hot wires is 480 volts. The specific amount of power provided may vary depending on the geographic location, the infrastructure available in the geographic location, density of users requiring power-related services, and/or the like.

In some embodiments, high-capacity converter 103 may convert single-phase power to multi-phase power. For example, the high-capacity converter 103 may convert single-phase AC to multi-phase AC using one or more techniques described further herein. In some embodiments, the high-capacity converter 103 may be selectively controlled by the system controller 106. Further details on the high-capacity power converter 103 are described in connection with FIGS. 2-4.

In some embodiments, the high-capacity converter 103 may provide the multi-phase power to the power distribution system 105. For example, the high-capacity converter 103 may provide the multi-phase power to the power distribution system 105 via a protective element 104.

In some embodiments, the controller 106 may be in communication with a remote monitoring controller 107. For example, a system may use a cellular modem, point to point microwave, satellite, TV White Space (TVWS), optical communications, low power technologies, high power technologies, mesh networking, and other telecommunications systems, either wired or unwired to allow remote access through the Internet, a dedicated device, and/or the like to provide remote control and monitoring through the controller 106.

Figure 2:
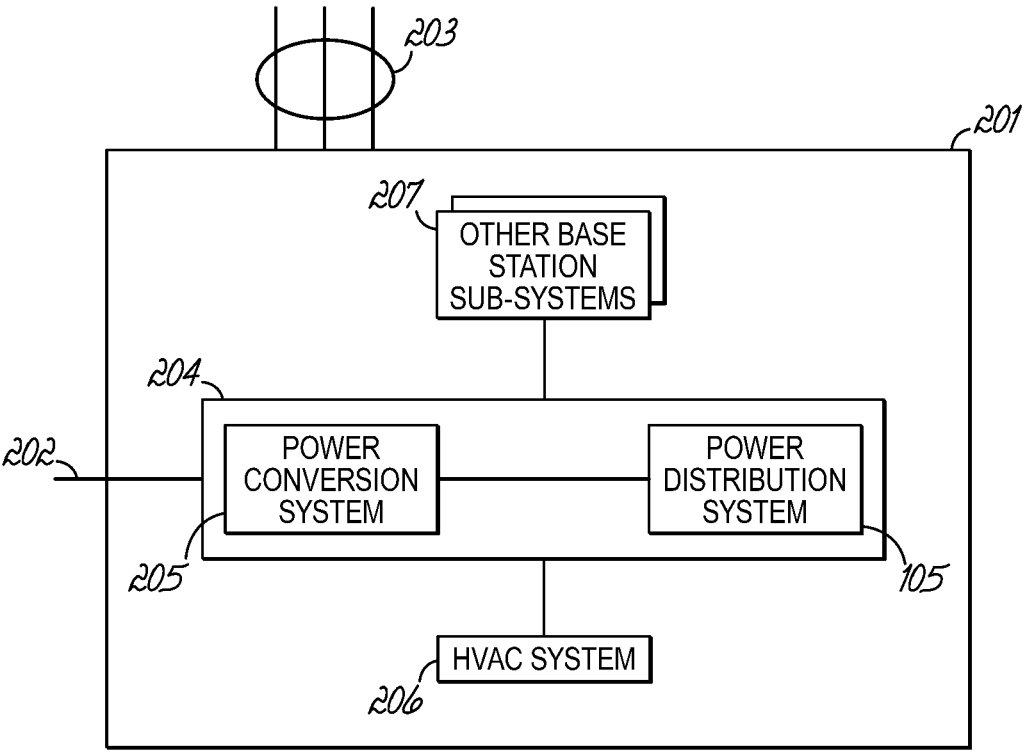
FIG. 2 illustrates a base station described according to the principles of the present disclosure.

FIG. 2 illustrates a base station 201 described according to the principles of the present disclosure. As can be seen in FIG. 2, the base station 201 is coupled to power lines 202 and data links 203. Data links 203 include a backhaul, a fronthaul, or a combination thereof. The base station 201 may be powered using power provided via power lines 202. The base station 201 may provide a network interface between wireless communication devices, wired communication devices, fiber optic cable devices, and the data links 203.

The base station 201 includes one or more devices capable of receiving, storing, processing, providing, and/or facilitating wireless network access, wired network access, cabled access or a combination thereof. For example, base station 201 may be a fixed base station, a control base station, a temporary base station, a repeater base station, and/or the like. Additionally, or alternatively, the base station 201 may be a macro base station, a micro base station, a Pico base station, a Femto base station, and relay base station, and/or the like. Additionally, or alternatively, the base station 201 may be a base station configured to provide 3G wireless communication services, a base station configured to provide 4G wireless communication services, a base station configured to provide 5G wireless communication services, a base station configured to provide point to point microwave communication services, a base station configured to provide satellite communications services, a base station configured to provide TVWS communications services, a base station configured to provide optical communications services, a base station configured to provide low power communications services, a base station configured to provide high power communications services, and/or the like. Additionally, or alternatively, the base station 201 may be an intelligent gateway base station. Additionally, or alternatively, the base station 201 may be any other type of base station known in the art. One of ordinary skill in the art can appreciate how one or more of the methods and/or techniques described herein may be applied to base stations configured to provide the latest wireless communication services, including sixth generation (6G) wireless communication services, seventh generation (7G) wireless communication services, etc.

The base station 201 may include a power management system 204, a heating ventilation and cooling (HVAC) system 206, and one or more other base station sub-systems 207. The power management system 204 may include the power distribution system 105 and a power conversion system 205. The power management system 204 manages single-phase power originating from the power lines 202. For example, the power management system 204 may receive single-phase AC and may convert the single-phase AC to multi-phase AC that can be used to deliver power to one or more power receiving components and/or devices. The power may, for example, be delivered to components and/or devices of the base station 201 that are described here, to a backup power source, and/or the like. The backup power source may include a battery, generator, and/or any other form of backup power known in the art.

The power conversion system 205 includes one or more devices capable of transmitting, storing, and/or providing power to the base station 201. For example, the power conversion system 205 may include the protective element 102, the high-capacity converter 103, the protective element 104, the controller 106, and/or any other components typically used in power conversion systems. The power distribution system 105 includes one or more components capable of receiving, converting, distributing, and/or delivering output power. The power distribution system 105 includes any component known in the art that facilitates or helps facilitate the delivery of power.

The HVAC system 206 includes one or more components capable of providing heating, ventilation, and/or air conditioning within the base station 201. For example, the HVAC system 206 may include an air conditioner, an air filter, a fan, ductwork, a thermostat, a control system, a heat exchanger and/or heat sink, insulation, and/or any other component used as part of an HVAC system. In some embodiments, the HVAC system 206 may reduce ambient temperature within the base station 201. For example, the power conversion system 205 may generate a material amount of heat when converting single-phase AC to multi-phase AC. To prevent overheating, the HVAC system 206 may use air conditioning to reduce the ambient temperature within the base station 201.

The one or more other base station sub-systems 207 includes any other components typically found in a base station. For example, the one or more other base station sub-systems 207 may include a baseband unit (BBU), a remote radio unit (RRU), an antenna, a transceiver, a power amplifier, a filter, a duplexer, a small cell controller, a beamforming unit, an integrated access and backhaul (IAB) unit, additional fronthaul systems, and/or the like. Additionally, or alternatively, the one or more other base station sub-systems may include a battery energy storage system (BESS). The BESS may be configured to provide multi-phase AC when the utility service connection is down. Details on the use of a BESS in connection with phase conversion are elaborated in U.S. patent application Ser. No. 18/179,787 filed Mar. 7, 2023, which is incorporated by reference herein.

Power lines 202 provide single-phase AC to the base station 201. Power lines 202 may include one or more transmission lines, transformers, distribution lines, utility poles or towers, insulators, lightning protection units, protective devices, metering equipment, and/or the like. In some embodiments, the power lines 202 may provide single-phase AC to the power conversion system 205 of the base station 201.

In some embodiments, the data links 203 include a backhaul that serves as a data link between the base station 201 and a core network (and/or other network infrastructure). Additionally, or alternatively, the data links 203 may include a fronthaul that serves as a data link between RRUs and BBUs. The data links 203 can carry various types of traffic, including voice calls, text messages, internet data, multimedia content, and/or the like. In some embodiments, the data links 203 may be implemented using wired connections, such as fiber optic cables, microwave links, ethernet cables, and/or the like. Additionally, or alternatively, the data links 203 may be implemented using wireless connections (e.g., using microwave links, millimeter-wave (MMW) links, satellite communications, TVWS, and/or the like).

Figure 3:
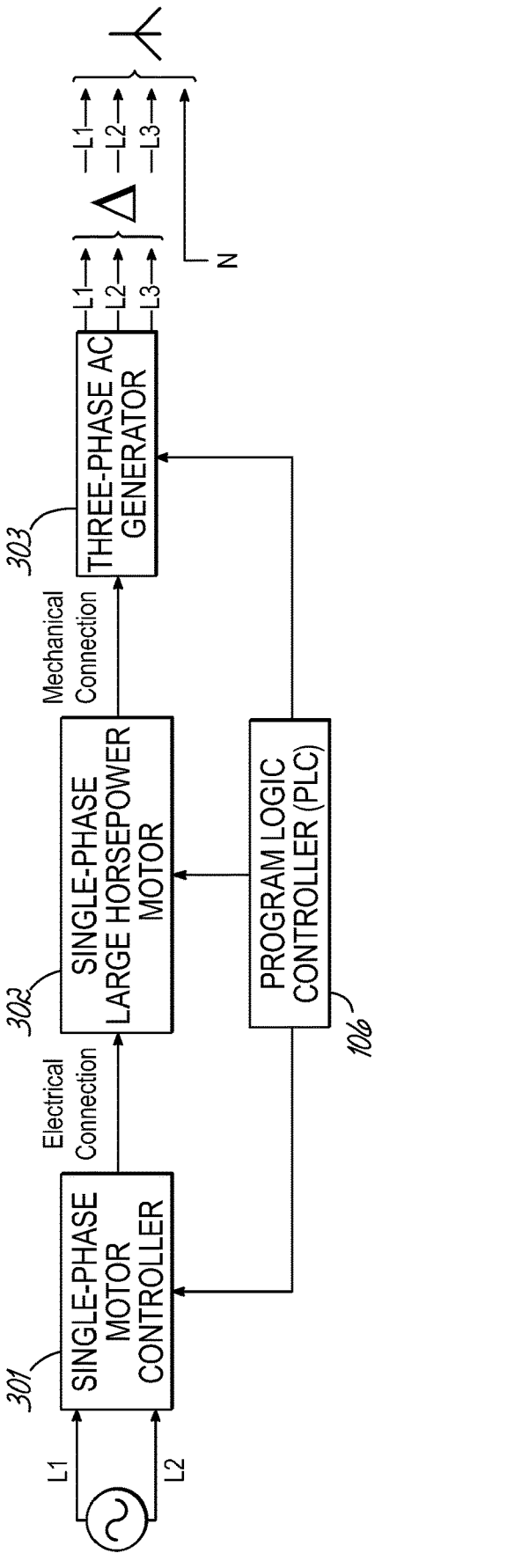
FIG. 3 illustrates two versions of a high-capacity converter that is part of the power conversion system, where the high-capacity converter utilizes a motor-generator with mechanical conversion to provide phase conversion according to the principles of the present disclosure.

FIG. 3 illustrates a system diagram 300 of alternate embodiments of a high-capacity converter 103 that is part of the power conversion system 205, where the high-capacity converter 103 utilizes a motor-generator with mechanical conversion to provide phase conversion according to the principles of the present disclosure. For example, the high-capacity converter 103 may include a single-phase motor controller 301, a single-phase large horsepower motor 302, and a three-phase AC generator 303.

In some embodiments, such as a first embodiment of FIG. 3, the high-capacity converter 103 (e.g., using the controller

301, the motor 302, and the generator 303) produces a 3-wire Delta output. In some embodiments, a neutral is combined with the three phases output from the high-capacity converter 103 (e.g., using the controller 301, the motor 302, and the generator 303) to produce a 4-wire WYE output. The high-capacity converter 103 used to deliver these outputs may, for example, be a high-capacity single-phase AC to three-phase AC converter trademarked "1-to-3" sold by Single-phase Power Solutions, LLC, which is described in U.S. Pat. Nos. 6,297,971 and 6,731,525, which are incorporated herein by reference.

In the first embodiment, the high-capacity converter 103 may create three-phase output power under the control of the controller 106 (which is shown as a program logic controller (PLC) 106). Specifically, the single-phase motor controller 301 (e.g., which may use an electric motor) is energized by the two input phase currents to produce the necessary service capacity to operate the single-phase large horsepower motor 302. The single-phase large horsepower electric motor 302 may be mechanically coupled to the three-phase AC generator 303. For example, the single-phase large horsepower electric motor 302 may include an output shaft that is directly coupled to an input shaft driving a rotor of the three-phase AC generator 303. The three-phase AC generator 303 may produce a separately derived source of three-phase AC power for supply to the power distribution system 105. The multi-phase output power may be configured in a 3-wire delta or 4-wire configuration depending on the input power requirements of the power distribution system 105.

The specific controllers, motors, and/or generators used may vary depending on the power delivery requirements of the power distribution system 105. In one example, the single-phase large horsepower motor 302 may be a BELLE large horsepower, single-phase motor sold by Single-Phase Power Solutions, LLC. Additionally, or alternatively, the single-phase large horsepower motor 302 may be a 100 HP single-phase motor operating on single-phase 480 Vac (e.g., 480 volts of AC power).

Figure 4:
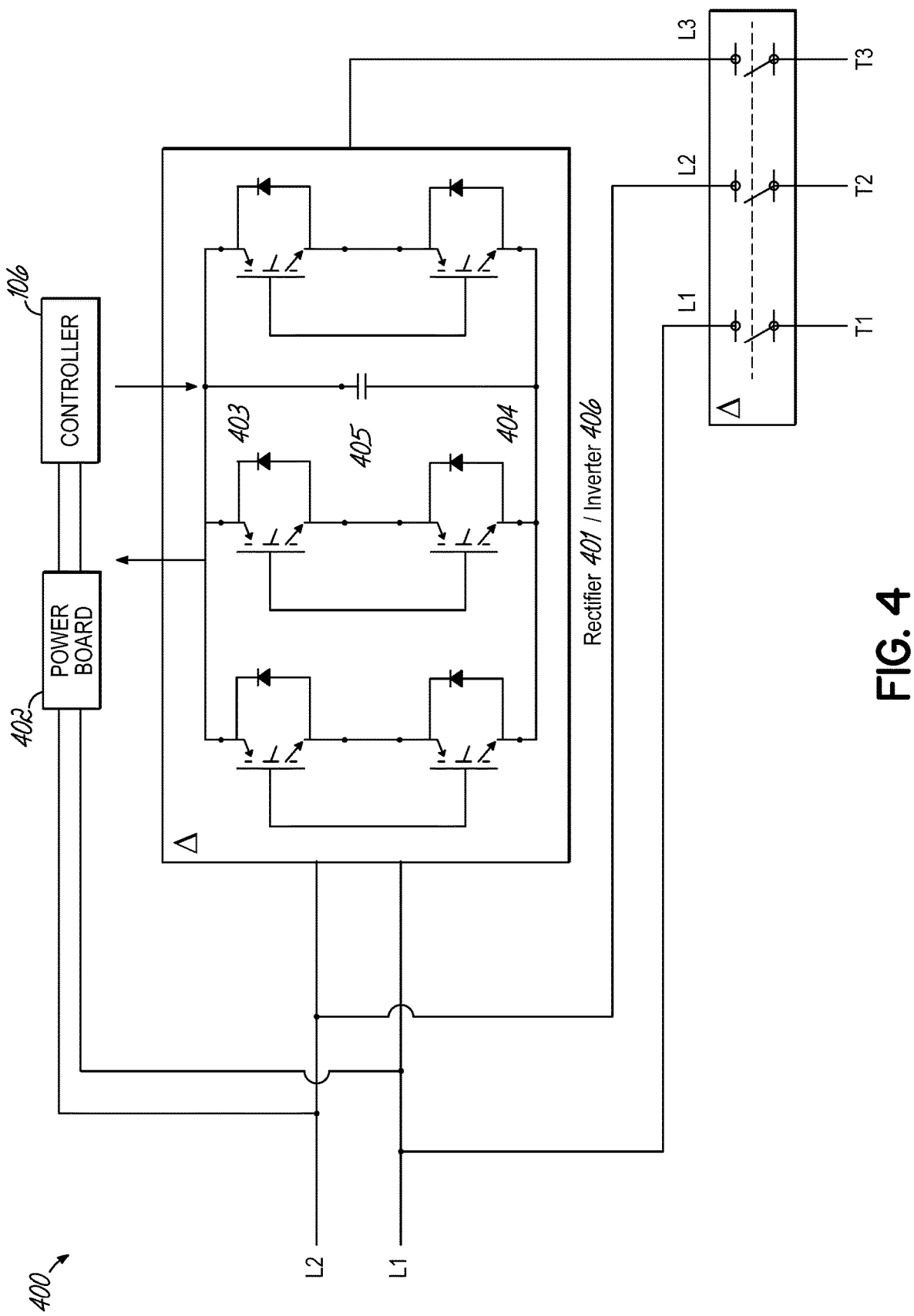
FIG. 4 is a schematic circuit diagram of a solid-state phase converter for use in an alternative embodiment of the present invention.

FIG. 4 is a schematic circuit diagram 400 of a high-capacity converter 103 using solid-state circuitry to carry out phase conversion in an alternative embodiment of the present invention. For example, the high-capacity converter 103 may use solid-state circuitry to convert single-phase 480 Vac (e.g., 480 volts of AC supply power) to three-phase 480 Vac (e.g., 480 volts of AC output power).

As shown, the high-capacity converter 103 may utilize the two input phase currents of the utility supply and may synthesize a third phase current. While not shown explicitly, L1, L2, and L3 refer to electrical lines. The input phase currents may traverse lines L1, L2 and the synthesized phase current may traverse line L3. The input phase and the synthesized current can be combined to create a balanced three-phase delta configured output.

In one version of this embodiment, the two input phases of the 120/240 single-phase utility supply 101 (which traverse lines L1, L2) pass directly through the high-capacity converter 103 to provide two phases of the three-phase output current. The third leg is synthesized from DC power produced by a rectifier 401. Under the control of the controller 106 and powered by its own power supply 402 (shown as power board 402), the rectifier 401 develops a DC voltage on terminals 403, 404 of the storage capacitor 405. The power on terminals 403, 404 is used to synthesize a third phase current using an inverter 406. The third phase current may traverse along line L3.

In the illustrated embodiment, a voltage between input terminals (e.g., a voltage as would be seen on the left side of FIG. 4) may be 480 Vac, and a third phase current may be synthesized to provide three-phase L-L power at 480 Vac. Other voltages are suitable.

Rectifier 401 may utilize a passive and/or active diode bridge, or may utilize a controlled rectification bridge using, e.g., silicon-controlled rectifiers (SCRs) instead of diodes. Controller 106 may be a digital controller, such as a digital signal processor (DSP) or another type of controller. The controller 106 controls the rectifier 401 via control signals which enable operation of the rectifier and manage operational timing of the rectifier 401. Power for the controller 106 is provided by a power supply 402 (shown as power board 402) which derives its power from the two input phase currents.

Rectified energy from lines L1 and L2 is stored in storage capacitor 405 which supplies inverter 406. Inverter 406 creates a synthesized third phase of approximately 415 Vac to ground by the operation of a parallel connected set of insulated-gate bipolar transistors (IGBTs) which are enabled in a timed and controlled sequence by the controller 106.

As noted above, in this particular system, two of the output phases come directly from the power line (e.g., power lines 202). Power to generate the voltage for the third lead flows into the high-capacity converter 103 through semiconductor switches to deliver energy to a capacitor. The switches on the input can control the waveform of the input current to minimize harmonic distortion on the power grid. The storage capacitor 405 is connected to a second set of semiconductor switches which feed a second inductor and a filter capacitor to smooth out the high-frequency pulses created by the switches.

The controller 106 for this embodiment of the system is a micro-controller, specifically a DSP which can measure voltages and deliver pulses into the switches, in addition to performing high-speed calculations. The output voltage is made equal in magnitude to the input voltage to an accuracy that is primarily determined by the measurement accuracy of the DSP.

Further details on the operation of this circuit and alternative circuits can be found in the aforementioned US Patents and patent application incorporated herein. Numerous other solid-state circuits using different components and implementing different theories of operation are also suitable, including circuits which synthesize two or all three output power phases, or synthesize additional phases for a 4-phase, 5-phase or greater number of phase outputs.

Figure 5:
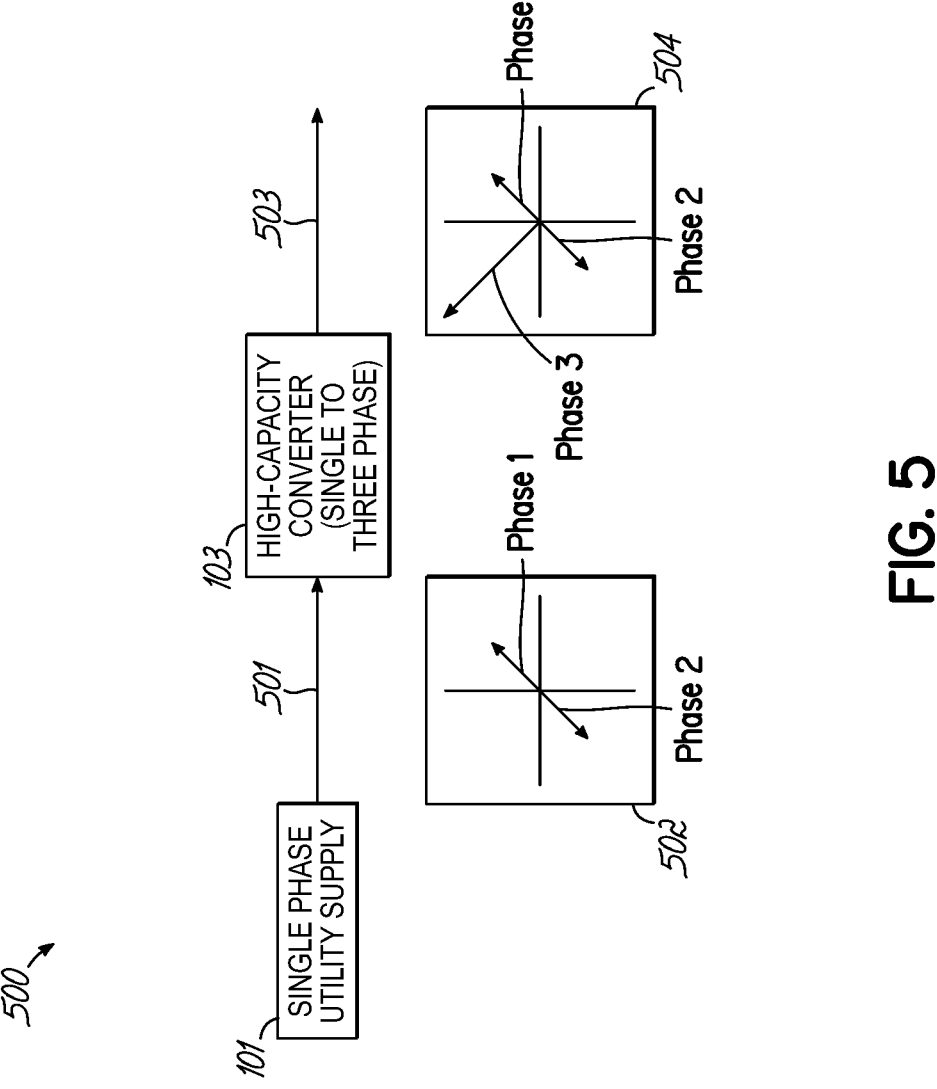
FIG. 5 illustrates a graphical representation of a current phasors and corresponding phase angles as the single-phase source is converted from single-phase to multi-phase.

FIG. 5 illustrates a graphical representation 500 of current phasors and corresponding phase angles as the single-phase source is converted from single-phase to multi-phase. For example, the single-phase utility supply 101 provides a single-phase current 501 to the high-capacity converter 103. The high-capacity converter 103 then converts the single-phase current 501 to a three-phase current 503 and provides the three-phase current 503 to the power distribution system 105.

In some embodiments, the three-phase output illustrated in FIG. 5 represents a delta (three-wire) output. This can be reconfigured to a wye (four-wire) output using a delta/wye isolation transformer, where the three-wire delta output of the power converter (e.g., high-capacity converter 103) serves as the primary input to the transformer and the four-wire wye output forms the secondary output of the transformer.

It will be appreciated that the power conversion system described herein, operated as explained here, provides an elegant solution to the challenges associated with providing telecommunication services to rural areas and other, similarly infrastructure-resourced, areas. These challenges hinder telecommunication service providers from committing the substantial financial investment that would be needed to upgrade the hardware infrastructure of the network (e.g., such as by re-cabling the wired connections to base stations in rural areas and other similarly infrastructure-resourced areas in order to provide them with multi-phase input AC). However, this problem is eliminated using the solution described herein because multi-phase output power is provided even if the hardware infrastructure of the network is supported using single-phase input AC.

Those of ordinary skill in the art will appreciate that there may be various manners of providing multi-phase output AC from single-phase input AC. For instance, alternative electrical or mechanical systems than those disclosed herein may be implemented to transfer energy from a single-phase to a multi-phase format for delivery to the power distribution system 105. Moreover, the multi-phase format delivered to the power distribution system 105 may utilize two phases spaced at 180 degrees, four phases spaced at 90 degrees or a higher number of phases, or phases spaced unequally, without variance from the inventive principles described herein. Various other modifications may be made to the illustrated embodiments without departing from the spirit and scope of the invention. Therefore, the invention lies in the claims hereinafter appended.

What is claimed is:

1. A power conversion system for supplying multi-phase electrical power to a power distribution system of a telecommunications base station, comprising:
   a. a utility service connection providing a single-phase alternating current (AC);
   b. a high-capacity converter coupled to said utility power source for converting the single-phase AC to a plurality of multi-phase AC, wherein one multi-phase AC is synthesized from direct current (DC) power derived from the single-phase AC, and wherein the single-phase AC is passed through and used for another multi-phase AC without being synthesized; and
   c. a controller, coupled to said power distribution system and said high-capacity converter, and controlling said high-capacity converter for delivery of power to the telecommunications base station via the plurality of multi-phase AC to provide or support telecommunication services.

2. The power conversion system of claim 1, further comprising a monitoring and control system coupled to the controller, in communication with a remote computing device for monitoring and control of power supplied to the power distribution system.

3. The power conversion system of claim 1, wherein the controller, during the delivery of power to the telecommunications base station, delivers the power to a heating ventilation and cooling (HVAC) system of the telecommunications base station such that the HVAC system utilizes the power to provide HVAC services to the high-capacity converter.

4. The power conversion system of claim 3, wherein the HVAC system, when providing the HVAC services, reduces an ambient temperature by an amount that satisfies a configurable threshold temperature.

5. The power conversion system of claim 1, further comprising a battery energy storage system (BESS) configured to provide the plurality of multi-phase AC when the utility service connection is down.

6. A method for supplying multi-phase electrical power to a power distribution system of a telecommunications base station, the method comprising:

a. receiving, by a power conversion system and via a utility service connection, a single-phase alternating current (AC);

b. converting, by a high-capacity converter of the power conversion system, the single-phase AC to a plurality of multi-phase AC, wherein one multi-phase AC is synthesized from direct current (DC) power derived from the single-phase AC, and wherein the single-phase AC is passed through and used for another multi-phase AC without being synthesized; and c. controlling, by a controller of the power conversion system, said high-capacity converter for delivery of power to the telecommunications base station via the plurality of multi-phase AC to provide or support telecommunication services.

* * * * *